US012675873B2

(12) United States Patent
Rybarczyk et al.

(10) Patent No.: US 12,675,873 B2
(45) Date of Patent: Jul. 7, 2026

(54) METHOD AND SYSTEM FOR DETECTING OPTICAL DEFECTS WITHIN A GLASS WINDSHIELD

(71) Applicant: SAINT-GOBAIN GLASS FRANCE, Courbevoie (FR)

(72) Inventors: Théo Rybarczyk, Courbevoie (FR); Laurent Remeur, Courbevoie (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 261 days.

(21) Appl. No.: 18/703,181

(22) PCT Filed: Oct. 20, 2022

(86) PCT No.: PCT/EP2022/079276
§ 371 (c)(1),
(2) Date: Apr. 19, 2024

(87) PCT Pub. No.: WO2023/067097
PCT Pub. Date: Apr. 27, 2023

(65) Prior Publication Data
US 2024/0420312 A1 Dec. 19, 2024

(30) Foreign Application Priority Data
Oct. 22, 2021 (EP) ..................................... 21204291

(51) Int. Cl.
*G06T 7/00* (2017.01)
*G01N 21/958* (2006.01)
*G06T 7/11* (2017.01)

(52) U.S. Cl.
CPC .......... *G06T 7/001* (2013.01); *G01N 21/958* (2013.01); *G01N 2021/9586* (2013.01); *G06T 7/11* (2017.01); *G06T 2207/30108* (2013.01)

(58) Field of Classification Search
None
See application file for complete search history.

(56) References Cited

U.S. PATENT DOCUMENTS 10,906,494 B1 * 2/2021 Chan ................. B60R 21/01562
2009/0282871 A1 11/2009 Shetterly et al.
(Continued)

FOREIGN PATENT DOCUMENTS

EP JR EP 0 463 940 A1 1/1992
EP EP 1 061 357 A2 12/2000
(Continued)

OTHER PUBLICATIONS

International Search Report as issued in International Patent Application No. PCT/EP2022/079276, dated Jan. 13, 2023.

*Primary Examiner* — Haris Sabah
(74) *Attorney, Agent, or Firm* — CUSHMAN PARTNERS, LLC

(57) ABSTRACT

A computer implemented method for detecting optical defects within a glass windshield. takes as input a map of angular distances between primary and ghost images of a periodical pattern viewed through said glass windshield, an image of the periodical pattern viewed through the glass windshield, and at least one shape parameter of the individual features of the periodical pattern. The method provides as output an image of optical defects within the glass windshield.

12 Claims, 5 Drawing Sheets

(56)        References Cited

U.S. PATENT DOCUMENTS

| | | | |
|---|---|---|---|
| 2011/0187855 | A1 | 8/2011 | Pichon et al. |
| 2011/0235894 | A1* | 9/2011 | Bookout ............... G06T 7/0004 |
| | | | 382/141 |
| 2012/0098959 | A1 | 4/2012 | Addington |
| 2016/0109363 | A1 | 4/2016 | Weigt |
| 2016/0245760 | A1 | 8/2016 | Grubert et al. |
| 2016/0266070 | A1* | 9/2016 | Baumgartel ........... G01N 29/36 |
| 2019/0111945 | A1* | 4/2019 | Wiegand .............. B60K 35/231 |
| 2019/0178816 | A1 | 6/2019 | Kubiak et al. |
| 2022/0398878 | A1* | 12/2022 | Michelfeit ......... G01N 29/4445 |

FOREIGN PATENT DOCUMENTS

| | | |
|---|---|---|
| GB | GB 2 152 210 A | 7/1985 |
| WO | WO 98/17993 A2 | 4/1998 |
| WO | WO 2009/065740 A1 | 5/2009 |
| WO | WO 2010/037958 A1 | 4/2010 |
| WO | WO 2014/191401 A1 | 12/2014 |
| WO | WO 2017/008159 A1 | 1/2017 |
| WO | WO 2018/024550 A1 | 2/2018 |

* cited by examiner

[Fig. 1]
1003     1003a     1000
1002
(B)
(C)
1003n
(A)     1001
[Fig. 2]
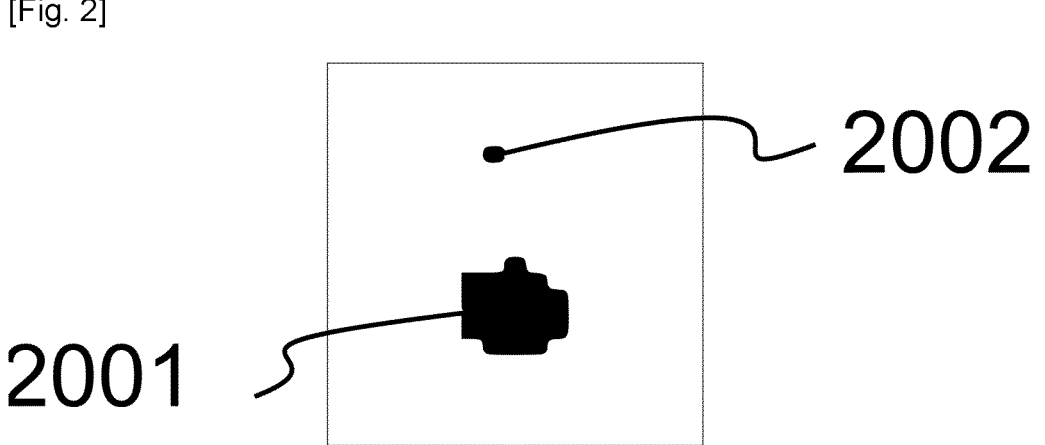
2002
2001

[Fig. 3]
3001
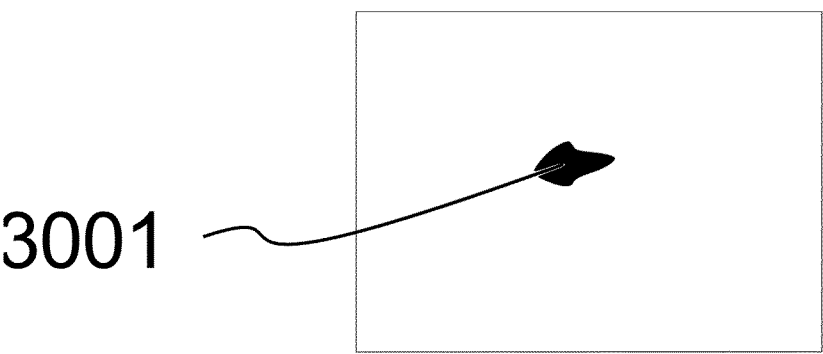

[Fig. 4]
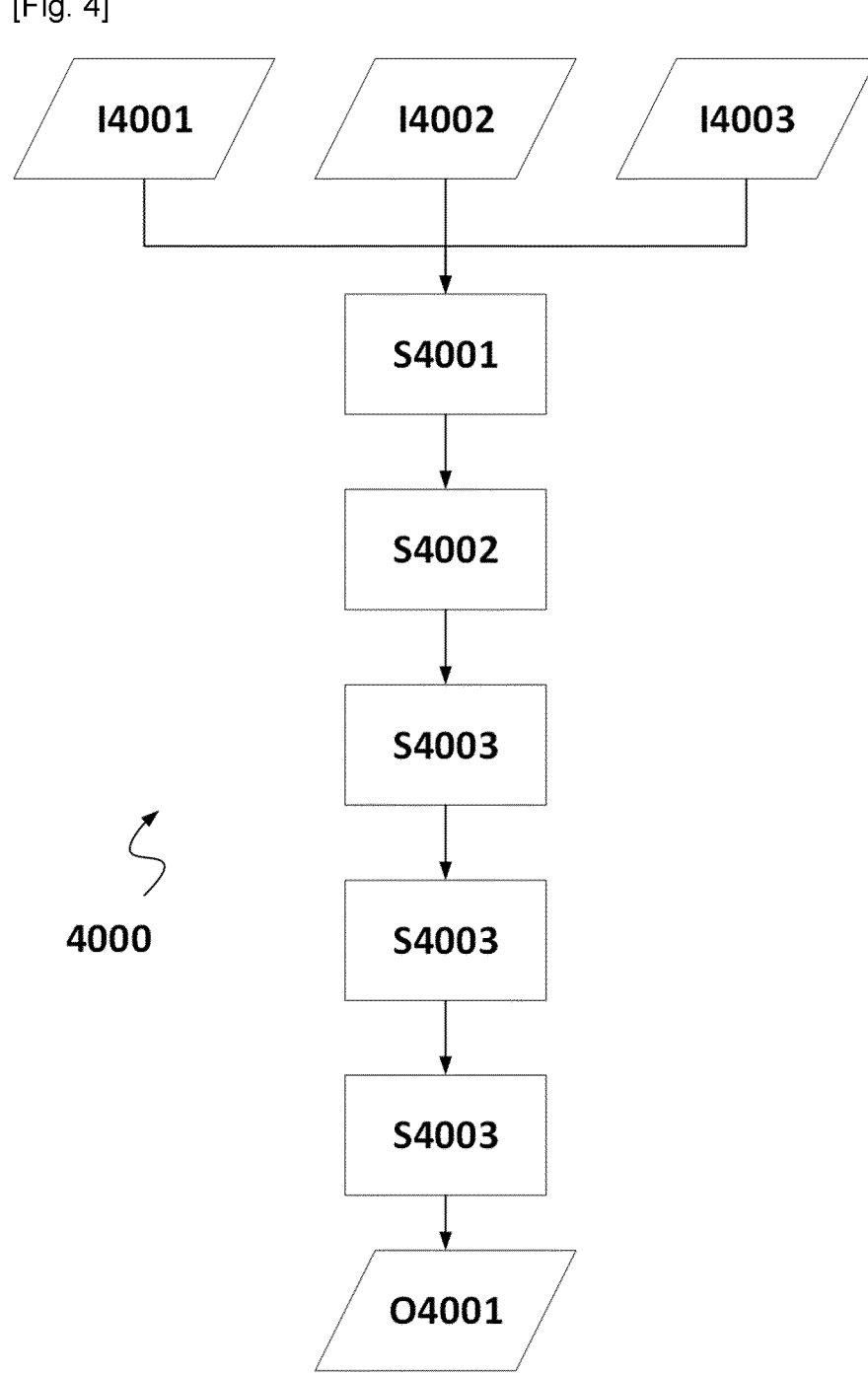

[Fig. 5]

[Fig. 6]
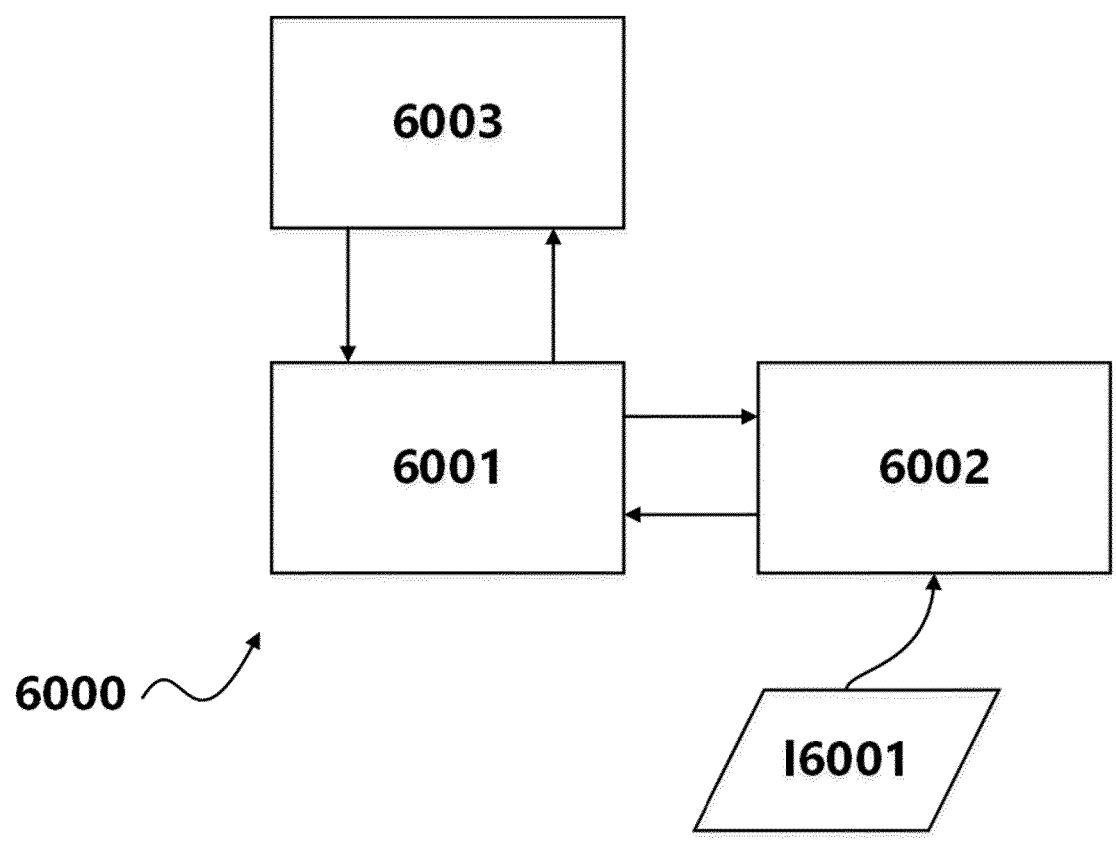

METHOD AND SYSTEM FOR DETECTING OPTICAL DEFECTS WITHIN A GLASS WINDSHIELD

CROSS-REFERENCE TO RELATED APPLICATIONS

This application is the U.S. National Stage of PCT/EP2022/079276, filed Oct. 20, 2022, which in turn claims priority to European patent application number 21204291.5 filed Oct. 22, 2021. The content of these applications are incorporated herein by reference in their entirety.

TECHNICAL FIELD

The present disclosure pertains to methods and systems for detecting optical defects within a glass windshield.

TECHNICAL BACKGROUND

Glass windshields are widely used in the transport industry, e.g. automotive, rail transport and aeronautics. They are glazing through which a driver views what is ahead, e.g. roads, rails, landscapes, . . . . They are usually made of two bended sheets of mineral glass that are laminated with a polymer interlayer.

For security reasons, the distortion of objects as seen through a windshield should be as low as possible, at least it should not confuse the driver. In this context, the optical quality of windshields has to fulfil certain requirements which are detailed in section 9.2 of Annex 3 of the Regulation No 43 of the Economic Commission for Europe of the United Nations (UN/ECE).

Several methods and instruments are described in the art, that may be intended to measure the optical distortion of windshields in the framework of the Regulation No 43.

US 2009 282871 A1 describes an apparatus and a method for measuring transmitted optical distortion in a glass sheet from the image of dot matrix transmitted through said glass sheet.

WO2014/191401 describes a method for determining the refractive power of a windshield from the geometrical deformations occurring in the image of a line grid acquired through the said windshield.

WO 2010/037958 A1 describes a device and a method for analysing the optical distortion of a windshield from measured phase shifts on an image of grid acquired through the said windshield.

WO 2009/065740 A1 describes a deflectometry system and method for the optical inspection of a phase and amplitude object placed in front of a periodic pattern, which are based on a two-step Fourier transform and reverse Fourier transform of the image of said periodic pattern through said object.

EP 0 463 940 A1 describes a process for measuring the optical quality of a windshield based on shadow illumination.

WO 9817993 A2, GB 2 152 210 A and EP 1 061 357 A2 describe methods for measuring optical distortions of windshield through image analysis of transmitted or reflected patterns.

WO 2017/008159 A1 describes a method to detect optical defects in windshields through analysis of composite images of chromatic aberrations.

WO 2018/024550 A1 describes an apparatus and method for determining an angular distance between the position of the primary and secondary images of multiple punctiform lights sources viewed through a windshield.

SUMMARY OF THE INVENTION

Technical Problem

As efficient as they may be, methods described in the art may fail to detect some peculiar optical defects, called threads, which, in glass industry, may look similar to what is called ream defects but much thinner and often substantially oriented along the longitudinal axis of the windshield.

These peculiar optical defects, which may be only visible to the driver and/or passenger at a specific angle or different angles of observation, may be completely overlooked by inspection systems on manufacturing line. In particular, systems and methods which are based on deflectometry may fail to detect them as no trace of theses defects may remain in the optical distortion map of the whole windshield.

In particular, threads seem to be able to disturb the electromagnetic signal acquired by the current inspection system in such a way that no signal is detected anymore by said inspections system. The inspection systems are then unable to distinguish whether this lack of signal comes from a real optical defect or from some elements that often garnish windshield, e.g. gasket, masking enamel . . . , or even from masking marks, e.g. ink marks, which are made on the surface of the windshield for operating said inspection system.

A direct and negative consequence is that a windshield, which was initially considered as fulfilling the technical specifications, may be afterwards rejected by customers. Complaints and production losses may then occur.

In this context, there is a need for a novel, easy-to-implement method for detecting optical defects within a glass windshield, in particular those peculiar optical defects called threads, which may be undetected by current inspection systems but may remain visible to a human driver.

Solution to the Technical Problem

In a first aspect of the disclosure, there is provided a computer implemented method for detecting optical defects within windshields as described in claim 1, dependent claims being advantageous embodiments.

In a second aspect of the invention, there is provided a data processing device, a computer program and a computer-readable medium to implement the method of the first aspect as described in claims 6 to 8.

In a third aspect of the invention, there is provided a process for detecting optical defects within a glass windshield as described in claim 9.

In a fourth aspect of the invention, there is provided an inspection system for detecting optical defects within a glass windshield as described in claim 10, dependent claims being advantageous embodiments.

The method, the process and the inspection system according to the disclosure may be used in a manufacturing process of windshields.

Advantages of the Invention

A first outstanding benefit of the invention is that it allows to detect optical defects, in particular threads, within a glass windshield, that may remain undetected by most common inspection systems but may still be seen by human eyes, e.g. eyes of a driver and/or passenger.

A second advantage is that the invention is relatively easy to implement in existing manufacturing processes so that it requires few, if any, adaptation. More precisely, the computer implemented invention and the process according to the invention may benefit from the facilities for acquiring digital image maps of optical power that are already available in manufacturing lines and/or control quality processes.

BRIEF DESCRIPTION OF DRAWINGS

FIG. 1 is a schematic sketch of an inspection system for acquiring an image of a periodical pattern through a glass windshield.

FIG. 2 is an example of superimposed primary and ghost images of an individual feature of a periodical pattern acquired through a windshield.

FIG. 3 is example of superimposed primary and ghost images of a distorted individual feature of a periodical pattern acquired through a windshield.

FIG. 4 is an example of image map of optical defects within a windshield provided as output by a method according to the first aspect of the invention.

FIG. 5 is a data flow diagram of a computer implemented method for detecting optical defects within a glass windshield according to one embodiment of the first aspect of the invention.

FIG. 6 is a data processing system according to one embodiment of the second aspect of the invention.

DETAILED DESCRIPTION OF EMBODIMENTS

In context of the disclosure, 'a signal artefact' should be understood according to the common definition in the field of signal processing. It may be understood as an unexpected, unwanted, or accidental alteration of a signal which represents an activity or a phenomenon other than what is intended or expected. For example, it may be an absence of signal or an outlier, i.e., a part of the signal that differs significantly from the remaining main part of said signal.

With reference to FIG. 1, an inspection system 1000 for detecting optical defects within a glass windshield comprises a digital image recording device 1001 which is placed behind a glass windshield 1002. The digital image recording device is configured for acquiring an image of a periodical pattern 1003 which is placed in front of the windshield 1001 and viewed through it. Once acquired, the image is processed in order to find out the optical distortion generated by the windshield when the electromagnetic signal, e.g. light, is traversing said windshield.

Most processing methods rely on a comparison of the individual features 1003*a-n* of the periodical pattern 1003 within the acquired image, i.e. as viewed through the windshield 1002, with those of the original periodical pattern 10003. The comparison allows to detect the individual features 1003*a-n* that appear distorted, and to compute relevant optical parameters, e.g. phase shift, optical power . . . to generate a map of optical distortion or angular distances of the windshield 1002.

Current inspection devices and methods fail to detect peculiar optical defects, called threads, within glass windshields. Threads may look similar to ream defects but much thinner and often substantially oriented along the longitudinal axis (B) of the windshield 1002. They seem to be able to disturb the incident electromagnetic signal, for instance light, which is afterwards acquired by the digital image recording device 1001 so that, for instance, no angular distance is computed at their location and then no optical distortion is reported.

A direct negative consequence is that current inspection systems and methods may be confused by not being able to determine the origin of that no signal detection and by often relating it to other elements that garnish the windshield and are not related to optical defects such as threads.

As an illustrative example, with reference to FIG. 2, angular distances at one location of a windshield may be computed from the distances between an individual feature, e.g. 1003*a* of a periodical pattern 1003 as it appears 2001 on a primary image of the said pattern 1003 as viewed through said windshield 1002 and the same individual feature, e.g. 1003*a*, as it appears shifted 2002 in the ghost image of said pattern. The computation of the angular distances is performed for each individual feature 1003*a-n* of the periodical pattern 1003 so that to generate a map of angular distance for all or part of the windshield.

Ghost images are well-known phenomena in optics and are caused by the internal reflection of light between the surfaces of an optical system, for instance a windshield, so that an object may appear twice with a spatial shift which depends on the refraction index of the optical system and the angle of observation of said object.

With reference to FIG. 3, optical defects, e.g. threads, within the windshield 1002 may disturb light path so that the ghost image of an individual feature, e.g. 1003*a*, of a periodical pattern 1003 is no more detected while the individual feature, e.g. 1003*a*, still remains highly distorted 3001. Such signal artefact, e.g. the no signal detection or outliers for ghost image, may be whether due to an absence of ghost image so that the optical system, e.g. windshield, may be considered as perfect, a too small shift between the primary image and the ghost image so that the not shifted feature and the shifted feature are superimposed and cannot be resolved, or a too high shift so that the shifted feature is out of the field of view of the acquiring system.

A direct negative consequence is that at the location of the optical defect the angular distance is close to zero. The angular map thus does not bear any sign of a defect whereas the individual is still distorted and clearly manifests of the presence of an optical defect.

In this context, with reference to FIG. 1 to FIG. 4, in a first aspect of the invention, there is provided a computer implemented method 4000 for detecting optical defects within a glass windshield 1002, wherein said method takes as input a map I4001 of angular distances between primary and ghost images of a periodical pattern 1003 viewed through said glass windshield, an image I4002 of the periodical pattern 1003 viewed through said glass windshield 1002, and at least one shape parameter I4003 of the individual features 1003*a*-1003*n* of the periodical pattern 1003;

wherein said method 4000 provides as output an image O2001 of optical defects, wherein said method 4000 comprises the following steps:

(a) searching S4001 signal artefacts within said input map I4001 of angular distances;

(b) searching S4002 individual feature 1003*a*-1003*n* of the periodical pattern 1003 in zones of the input image I4002 of the periodical pattern 1003, wherein said zones matched those of the signal artefacts searched at step (a);

(c) delineating S4003 by image processing the respective shape of the searched individual features 1003*a*-1003*n*;

(d) comparing S4004 the input shape parameter I4003 of the individual features 1003a-1003n of the periodical pattern 1003 to the corresponding shape parameter of the delineated shapes of step (c);

(e) generating S4005 an image from the input image I4002 of the periodical pattern 1003, wherein the input shape parameter I4003 of the individual features 1003a-1003n of the periodical pattern 1003 does not match to the corresponding shape parameter of the delineated shapes, said generated image being the image of optical defects.

In preferred embodiments, at step S4001, the searched signal artefacts are no signal detection or signal outliers for ghost image of the of the map I4001 of angular distances. The no signal detection or signal outliers may be due to an absence of ghost image so that the optical system, e.g. windshield, may be considered as perfect, a too small shift between the primary image and the ghost image so that the not shifted feature and the shifted feature are superimposed and cannot be resolved, or a too high shift that the shifted feature is out of the field of view of the acquiring system.

The shape parameter I4001 of the individual feature 1003a-1003n and the corresponding one of the delineated shapes may be any morphological parameter for measuring or quantifying at least one morphological property of the individual feature and delineated shapes.

Accordingly, in certain embodiments, the shape parameter I4001 is selected from area, circularity, solidity, minor axis, major axis, perimeter, Feret diameter, or combination thereof.

At step S4002, for the delineating operation, any delineating operation, such as image segmentation, available in the field of image processing may be used. For example, it may be thresholding, watershed or random walker segmentation.

Figure 5:
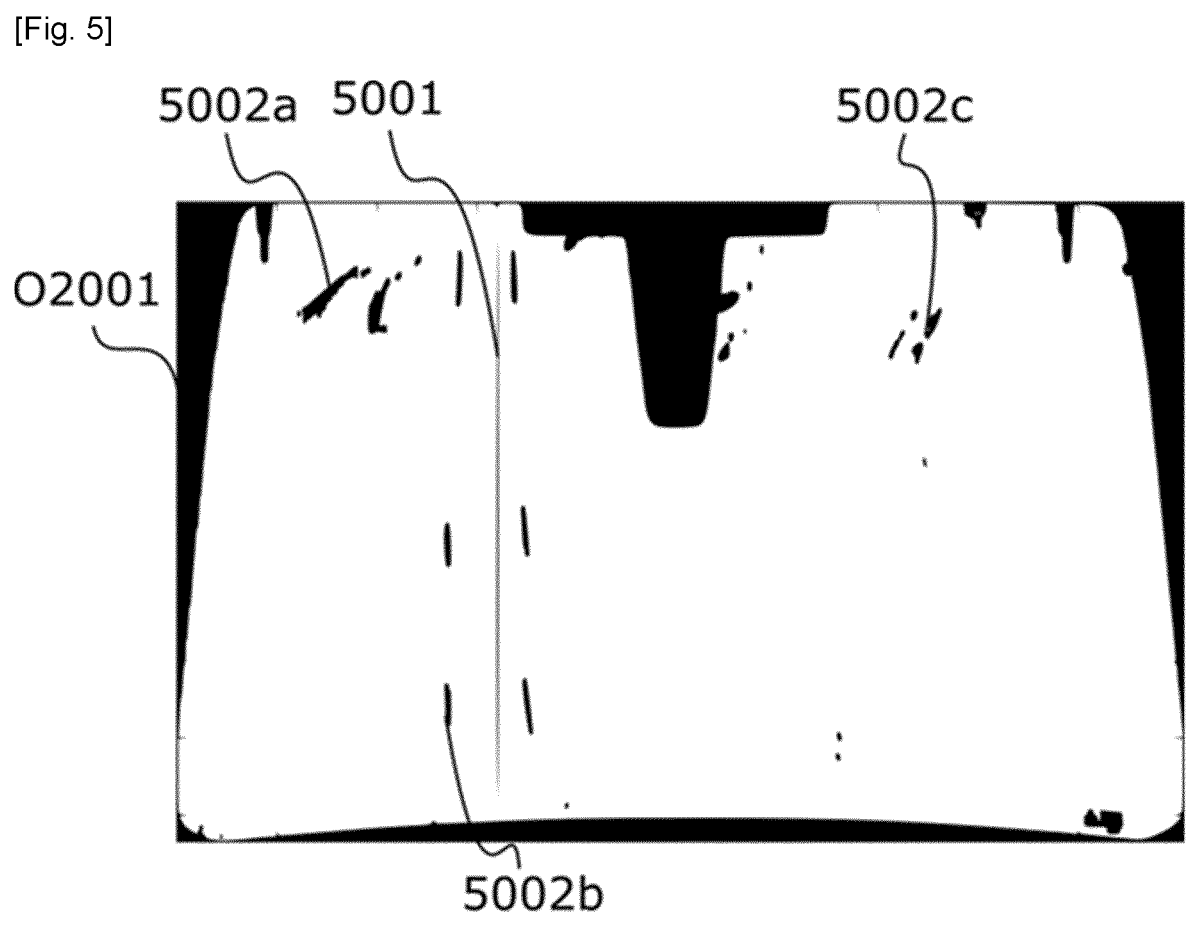

In step S2005, with reference to FIG. 5 as an illustrative example embodiment, an image map O2001 of optical defects 5001 is generated from the delineated areas of step S2002. In FIG. 5, the detected glass defect 5001 is a so called thread, which a thin elongated glass defect oriented along the longitudinal axis (B) of the windshield. As the method according to first aspect of the invention is able to detect such thin glass defects, it is unable to detect non optical transparent glass defects, e.g. garnishing elements 5002a-c such as ink marks made on the surface of the glass windshield, enamels, gaskets, . . . .

In preferred embodiments, as illustrated on FIG. 1, the periodical pattern 1003 may be a dot matrix. In more preferred embodiments, the dots of the dot matrix may be point-like light sources, e.g. point-like LED. Most accurate results may be obtained with point-like sources, in particular for thin elongated optical defects, e.g. threads.

In a second aspect of the invention, with reference to FIG. 6, there is provided a data processing system 6000 comprising means for carrying out a method 2000 according to any one of the embodiments of the first aspect of the invention, and a computer program I6001 comprising instructions which, when executed by a computer, cause the computer to carry out a method according to any one of embodiments of the first aspect of the invention.

The data processing system 6000 comprises means 6001 for carrying out a method according to any of the embodiments of the first and second aspect of the invention. Example of means 6001 for carrying out the method may be a device which can be instructed to carry out sequences of arithmetic or logical operations automatically to perform tasks or actions. Such device, also called computer, may comprise one or more Central Processing Unit (CPU) and at least a controller device that are adapted to perform those operations.

It may further comprise other electronic components like input/output interfaces 6003, non-volatile or volatile storage devices 6002, and buses that are communication systems for the data transfer between components inside a computer, or between computers. One of the input/output devices may be user interface for human-machine interaction, for example graphical user interface to display human understandable information.

As calculation may require a lot of computational power to process substantial amounts of data, the data processing system may advantageously comprise one or more Graphical Processing Units (GPU) whose parallel structure makes them more efficient than CPU, in particular for image processing in ray tracing.

Regarding the computer program I6001, any kind of programming language, either compiled or interpreted, may be used to implement the steps of the method of the invention. The computer program 16001 may be part of a software solution, i.e., part of a collection of executable instructions, code, scripts, or the like and/or databases.

In certain embodiments, there is also provided a computer-readable storage or medium 6002 comprising instructions which, when executed by a computer, cause the computer to carry out the method according to any of the embodiments of the first aspect of the invention.

The computer-readable storage 6002 may be preferably a non-volatile storage or memory, for example hard disk drive or solid-state drive. The computer-readable storage may be removable storage media or a non-removable storage media as part of a computer.

Alternatively, the computer-readable storage may be a volatile memory inside a removable media.

The computer-readable storage 6002 may be part of a computer used as a server from which executable instructions can be downloaded and, when they are executed by a computer, cause the computer to carry out a method according to any of the embodiments described herein.

Alternatively, the program I6001 may be implemented in a distributed computing environment, e.g., cloud computing. The instructions may be executed on the server to which client computers may connect and provide encoded data as inputs to the method. Once data are processed, the output may be downloaded and decoded onto the client computer or directly send, for example, as instructions. This kind of implementation may be advantageous as it can be realised in a distributed computing environment such as a cloud computing solution.

In a third aspect of the invention, there is provided a process for detecting optical defects within a glass windshield 1002, wherein said process comprises the following steps:

(a) providing a glass windshield 1002;

(b) acquiring, with an inspection system 1000, a map I4001 of angular distances between primary and ghost images of a periodical pattern 1003 viewed through said glass windshield 1002 and an image I4002 of the periodical pattern 1003 viewed through said glass windshield 1002;

(c) defining at least one shape parameter (I4003) of the individual features (1003a-1003n) of the periodical pattern (1003);

(d) carrying out a method according to any embodiment of the first aspect of the invention, wherein said map (I4001) of angular distances, said image (I4002) of the periodical pattern (1003) and said at least one shape parameter (I4003) are provided as input.

Technical aspects and features of the different embodiments detailed in the context of the first and second aspects of the invention may also apply to the third aspect of the invention. It is in the reach of a person skilled in the art to change, transform or adapt them in a process according to the third aspect of the invention.

In a fourth aspect of the invention, with reference to FIG. 1 and FIG. 6, there is provided an inspection system 1000 for detecting optical defects within glass windshield, wherein said inspection system 1000 comprises:

a periodical pattern 1003, preferably a dot matrix of point-like light sources;

an acquisition device 1001 configured to a map I4001 of angular distances between primary and ghost images of a periodical pattern 1003 viewed through said glass windshield 1002 and an image I4002 of the periodical pattern 1003 viewed through said glass windshield 1002;

a data processing system 6000 comprising means for carrying out a method 4000 according to any embodiment of the first aspect of the invention.

The acquisition module 1001 may be digital image recording device such as matrix camera, e.g. CCD or CMOS camera systems.

In a certain embodiment, the inspection system may further comprise a display module, e.g. a digital display screen, for displaying an image map of optical defects.

The method, the process and the inspection system according to the disclosure may be advantageously used in a manufacturing process of windshields.

All embodiments described herein, whether it concerns the first, second, third or fourth aspect of the invention, may be combined by one skilled in the art unless they appear to him technically incompatible.

Further, although the invention has been described in connection with preferred embodiments, it should be understood that various modifications, additions and alterations may be made to the invention by one skilled in the art without departing from the spirit and scope of the invention as defined in claims.

The invention claimed is:

1. A computer implemented method for detecting optical defects within a glass windshield, wherein said method takes as input a map of angular distances between primary and ghost images of a periodical pattern viewed through said glass windshield, an image of the periodical pattern viewed through said glass windshield, and at least one input shape parameter of the individual features of the periodical pattern;

wherein said method provides as output an image of optical defects, wherein said method comprises the following steps:

(a) searching signal artefacts within said input map of angular distances;

(b) searching individual feature of the periodical pattern in zones of the input image of the periodical pattern, wherein said zones matched those of the signal artefacts searched at step (a);

(c) delineating by image processing the respective shape of the searched individual features;

(d) comparing the input shape parameter of the individual features of the periodical pattern to a corresponding shape parameter of the delineated shapes of step (c);

(e) generating an image from the input image of the periodical pattern, wherein the input shape parameter of the individual features of the periodical pattern does not match to the corresponding shape parameter of the delineated shapes, said generated image being the image of optical defects.

2. The computer implemented method according to claim 1, wherein the searched signal artefacts are a no signal detection or signal outliers for the ghost image of the map of angular distances.

3. The computer implemented invention according to claim 1, wherein the input shape parameter is selected from area, circularity, solidity, minor axis, major axis, perimeter, Feret diameter, or combination thereof.

4. The computer implemented method according to claim 1, wherein the periodical pattern is a dot matrix.

5. The computer implemented method according to claim 4, wherein dots of the dot matrix are point-like light sources.

6. A data processing system comprising a computer configured to carry out a method according to claim 1.

7. An inspection system for detecting optical defects within glass windshield, wherein said inspection system comprises:

a periodical pattern, preferably a dot matrix of point like light sources;

an acquisition device configured to a map of angular distances between primary and ghost images of a periodical pattern viewed through said glass windshield and an image of the periodical pattern viewed through said glass windshield;

a data processing system according to claim 6.

8. The inspection system according to claim 7, comprising a display module for displaying an image map of optical defects.

9. The inspection system according to claim 7, wherein the periodical pattern comprises a dot matrix of point-like light sources.

10. A computer program comprising instructions which, when the program is executed by a computer, causes the computer to carry out a method according to claim 1.

11. A non-transitory computer-readable medium comprising instructions which, when said instructions are executed by a computer, causes the computer to carry out a method according to claim 1.

12. A process for detecting optical defects within a glass windshield, wherein said process comprises the following steps:

(a) providing a glass windshield;

(b) acquiring, with an inspection system, a map of angular distances between primary and ghost images of a periodical pattern viewed through said glass windshield and an image of the periodical pattern viewed through said glass windshield;

(c) defining at least one shape parameter of the individual features of the periodical pattern;

(d) carrying out a method according to claim 1 wherein said map of angular distances, said image of the periodical pattern and said at least one shape parameter are provided as input.

* * * * *